(12) United States Patent
Yang

(10) Patent No.: US 9,406,133 B2
(45) Date of Patent: Aug. 2, 2016

(54) SYSTEM AND METHOD FOR REAL-TIME IMAGE REGISTRATION

(71) Applicant: Qiang Yang, Rochester, NY (US)

(72) Inventor: Qiang Yang, Rochester, NY (US)

(73) Assignee: University of Rochester, Rochester, NY (US)

( * ) Notice: Subject to any disclaimer, the term of this patent is extended or adjusted under 35 U.S.C. 154(b) by 25 days.

(21) Appl. No.: 14/596,927

(22) Filed: Jan. 14, 2015

(65) Prior Publication Data

US 2015/0206309 A1    Jul. 23, 2015

Related U.S. Application Data

(60) Provisional application No. 61/929,568, filed on Jan. 21, 2014.

(51) Int. Cl.
| | |
|---|---|
| *G06K 9/68* | (2006.01) |
| *G06T 7/00* | (2006.01) |
| *G06K 9/62* | (2006.01) |
| *G06T 5/50* | (2006.01) |
| *G06K 9/00* | (2006.01) |

(52) U.S. Cl.
CPC .......... *G06T 7/0038* (2013.01); *G06K 9/00973* (2013.01); *G06K 9/6202* (2013.01); *G06T 5/50* (2013.01); *G06T 2207/20056* (2013.01); *G06T 2207/20216* (2013.01)

(58) Field of Classification Search
None
See application file for complete search history.

(56) References Cited

U.S. PATENT DOCUMENTS

| | | | | |
|---|---|---|---|---|
| 7,758,189 B2* | 7/2010 | Hammer | ................ | A61F 9/008 351/200 |
| 8,201,943 B2* | 6/2012 | Hammer | .............. | A61B 3/1025 351/200 |
| 8,696,122 B2* | 4/2014 | Hammer | ................ | A61B 3/102 351/205 |
| 9,210,417 B2* | 12/2015 | Hall | ...................... | G06T 7/0024 |

OTHER PUBLICATIONS

Braaf, et al. "Real-time eye motion correction in phase-resolved OCT angiography with tracking", Optical Society of America, 2012, pp. 1-13.*

* cited by examiner

*Primary Examiner* — Daniel Mariam
(74) *Attorney, Agent, or Firm* — Harris Beach PLLC

(57) ABSTRACT

A method for image registration includes the steps of: providing a computer and an imager; acquiring and processing a reference image frame including a plurality of reference strips; acquiring and correcting a target frame by the steps of: acquiring one or more target frame strips of the target frame; comparing the one or more target frame strips in real-time to one or more corresponding strips of the reference frame based on a calculated registration of a specific target frame strip from a previous target frame; correcting a registration of the one or more target frame strips; repeating steps until a last strip of the target frame; repeating the steps of acquiring and correcting a target frame until a last target frame is acquired; and saving processed image based on a plurality of corrected target frames to a non-volatile memory. A system to perform the method is also described.

23 Claims, 10 Drawing Sheets

SYSTEM AND METHOD FOR REAL-TIME IMAGE REGISTRATION

CROSS-REFERENCE TO RELATED APPLICATIONS

This application claims the benefit under 35 U.S.C §119(e) to U.S. Provisional Application No. 61/929,568, SYSTEM AND METHOD FOR REAL-TIME IMAGE REGISTRATION, filed Jan. 21, 2014, and is related to U.S. patent application Ser. No. 14/483,289, REAL-TIME OPTICAL AND DIGITAL IMAGE STABILIZATION FOR ADAPTIVE OPTICS SCANNING OPHTHALMOSCOPY, filed Sep. 11, 2014, and U.S. Provisional Patent Application Ser. No. 61/879,961, REAL-TIME OPTICAL AND DIGITAL IMAGE STABILIZATION FOR ADAPTIVE OPTICS SCANNING OPHTHALMOSCOPY, filed Sep. 19, 2013, all of which applications are incorporated herein by reference in their entirety.

STATEMENT REGARDING FEDERALLY FUNDED RESEARCH OR DEVELOPMENT

This invention was made with government support under Biomedical Research Partnership Grant Number EY014375 awarded by the National Institutes of Health (NIH). The government has certain rights in the invention.

FIELD

The application relates to image correction, and particularly to image registration correction for images created from multiple frames.

BACKGROUND

In many diverse fields of technology, final images are created from many single "snap-shot" exposures or image frames. Typically, two or more image frames acquired over a period of time are used to create a final image. Unfortunately, errors caused by factors, such as motion over time, can limit the quality of such final images.

SUMMARY

According to one aspect, a method for image registration includes the steps of: providing a computer and an imager, the computer configured to receive a plurality of image frames from the imager; acquiring and processing a reference image frame including a plurality of reference strips; acquiring and correcting a target frame by the steps of: acquiring one or more target frame strips of the target frame; comparing the one or more target frame strips in real-time to one or more corresponding strips of the reference frame based on a calculated registration of a specific target frame strip from a previous target frame; correcting a registration of the one or more target frame strips; repeating steps from the step of acquiring and correcting one or more target frame strips to the step of correcting a registration until a last strip of the target frame; repeating the steps of acquiring a target frame until a last target frame is acquired; and saving a processed image based on a plurality of corrected target frames to a non-volatile memory.

In one embodiment, the specific strip includes a center strip.

In another embodiment, the plurality of corrected target frames are averaged together to create an averaged image with a signal to noise ratio (S/N) higher than the S/N of each individual target frame.

In yet another embodiment, a detected motion of one or more strips of the target frame exceeding a motion threshold causes the target frame to be not included in the plurality of corrected target frames.

In yet another embodiment, following the detected motion of one or more strips of the target frame which exceeds the motion threshold, a recovery process uses a two dimensional FFT of an entire target frame image to recover from a large motion.

In yet another embodiment, the detected motion includes a saccade threshold or a blink threshold.

In yet another embodiment, the method further includes the step of removing a distortion or warping of the one or more target frame strips before the step of calculating the registration of each strip.

In yet another embodiment, the method further includes the step of removing noise from the one or more target frame strips by convolution before the step of calculating the registration of each strip.

In yet another embodiment, the method further includes the step of enhancing an image feature of the one or more target frame strips before the step of calculating the registration of each strip.

In yet another embodiment, the step of acquiring and processing a reference image frame includes applying a two dimensional FFT to each strip of the reference frame and saving a two dimensional FFT result to a memory.

In yet another embodiment, the step of acquiring and processing a reference image frame includes applying a two dimensional FFT to a number of combined strips of the reference frame and saving a two dimensional FIT result to a memory.

In yet another embodiment, the step of acquiring and processing a reference image frame includes applying a two dimensional FFT to an entire frame of the reference frame and saving a two dimensional FFT result to a memory.

In yet another embodiment, the step of comparing the one or more target frame strips in real-time to one or more corresponding strips of the reference frame further includes comparing a two dimensional FFT of the one or more target frame strips to a two dimensional FFT one or more reference strips by a cross-correlation operation.

In yet another embodiment, the step of comparing the one or more target frame strips in real-time to one or more corresponding strips of the reference frame further includes comparing a two dimensional FFT of the one or more target frame strips to a two dimensional FFT one or more reference strips by a spatial domain cross correlation operation.

According to another aspect, a real-time image processing system includes an imager configured to acquire a plurality of image frames. A computer is communicatively coupled to the imager. The computer is configured by program code stored in a non-volatile memory to receive the plurality of image frames in real-time as strips of the image frames and to process the strips in real-time so as to correct a registration of the one or more strips by comparing one or more target frame strips in real-time to one or more corresponding strips of a reference frame based on a calculated registration of a specific target frame strip from a previous target frame, and to combine a plurality of registration corrected target frames to provide a processed image saved to a non-volatile memory, the processed image having a S/N ratio higher than the S/N of each individual target frame.

In one embodiment, the imager includes a LASER scanning imager.

In another embodiment, the imager includes an imaging device including a plurality of detector cells.

In yet another embodiment, the imager includes semiconductor imaging device.

In yet another embodiment, the system further includes at least one adaptive element having a controllable position, wherein the controllable position is updated during acquisition of one or more target frames based on a real-time target frame strip registration process.

In yet another embodiment, the adaptive element includes a controllable mirror.

In yet another embodiment, the imager includes an adaptive optics scanning light ophthalmoscope (AOSLO).

In yet another embodiment, the imager includes a satellite imager.

In yet another embodiment, the image processing system includes a 3D imager.

The foregoing and other objects, aspects, features, and advantages of the invention will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1:
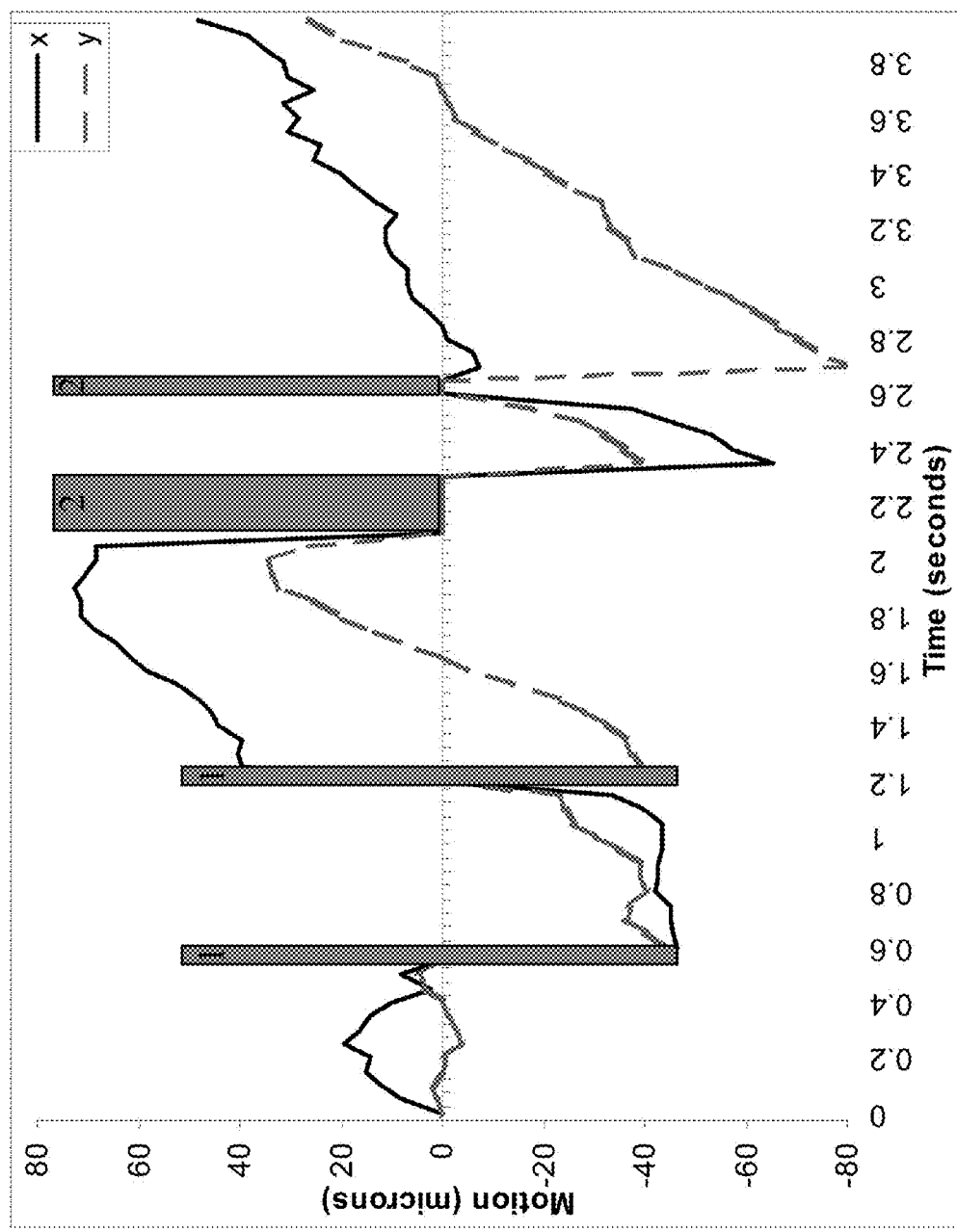
FIG. 1 shows a graph illustrating fixational human eye motion plotted versus time.

As described hereinabove, in many applications, multiple images, typically called frames, can be combined and averaged to improve the quality and usable detail of the image, such as by averaging to improve the signal to noise (S/N) ratio of the image so that the S/N ratio of the averaged image is higher than the S/N ratio of an individual target frame. The frames are typically acquired successively over a period of time. Any motion, such as undesired movement of the imaging apparatus and/or of the surface being imaged, can cause the structure being imaged to appear at slightly different locations in different frames.

Take, for example, a very simple imaging system having an object, a lens, to create an image. Motion of the image can be caused by the motion of the object, and/or the motion of the lens. Using this relatively simple exemplary optical system in an ophthalmic application, images of the retina can move because the lens in front of the retina is moving. The retina (object) also moves, but the amplitude is smaller than the amplitude of the lens motion. To help minimize undesired eye motion while performing imaging of the retina of the human eye (e.g. imaging of the fovea), a patient can be asked to focus their attention on a fixed target. Yet, no matter how devoted to a study the patient is, there will still be unintentional movement. Eye motion can include a variety of natural motions, such as drifts, saccades, blinks, and microsaccades. Also, there can be rotation of the image. Since such imaging is performed from outside the eye, typically viewing the surface being imaged through multiple intermediate layers of the eye, there can be other distortions, such as, for example, warping caused by short term changes in the lens of the eye.

Thus it can be seen that one problem in creating a final image from a number of frames is that unless each frame is corrected (e.g. registration correction, such as translation and/or rotation), the averaged final image will not be able to take full advantage of the averaging process and the final product will be sub-standard, e.g. with a higher S/N ratio than might otherwise have been achievable.

However, another problem is that there can be movement within each frame image. In such cases, mere correction of an entire frame is insufficient to prepare a plurality of target frames to be combined, e.g. by averaging into one final averaged image. While such an averaged image based on a single registration correction (e.g. translation in x, y and/or rotation) of each target frame image would result in a final averaged imaged with a somewhat improved S/N ratio over each of the target frame themselves, however such an averaged image is still flawed because of distortion within each frame and/or translation and/or rotation that changes during the time of the acquisition of each individual frame.

Another problem is related to the rate at which new updated information is needed to actively control and correct an imaging system. In adaptive imaging systems, there is an increasing interest in faster, more accurate, corrections, such as by fast controllable mirrors in the optical path of an imager. For example, in ophthalmic applications, even with the assistance of a fixational target for a patient to view during imaging, the human eye moves during imaging. Also, the lens as well as other parts of the eye change shape during imaging including at rates fast enough to cause changes during an acquisition of each target frame. Or, for example, in satellite imaging systems, it is understood that there can be relatively fast undesirable motion of the imaging system hardware (e.g. caused by vibration), as well as distortion caused by imaging through the atmosphere. By combining adaptive techniques (e.g. in ophthalmic LASER scanning systems or satellite imaging hardware including a satellite imager) with image real-time processing, image quality can still be significantly improved over the best previously available prior art techniques.

One simplified method for measuring errors, such as registration errors in successive target image frames is to compare each target frame to a reference frame. One method for comparing a given target frame to a reference frame is to calculate a two dimensional FFT for the reference frame and each of the target frames. One problem with such a simple approach is that it is not fast enough for real-time control of adaptive systems such as adaptive mirrors of adaptive optic systems. Another problem is that such a cross correlation is too rough where changes as described hereinabove typically occur during the acquisition of each frame.

It was realized that if each target frame is broken into a plurality of strips (and some cases sub-strips), that a much faster rate of registration information can be obtained. Also, it would be possible to correct the registration of parts of each target frame differently, thus providing more accurately corrected target frames to be combined (e.g. by averaging) to produce a higher quality averaged image with an improved S/N ratio over simply registering each target frame in its entirety.

Therefore, according to the new method, each incoming frame is processed as a number of strips. In a real-time system, each strip can be compared to the reference image and then the strip corrected for registration and distortion. However, it was further realized that find the correct location or strip of the reference image was problematic and slow. Depending on the motion of the system and/or surface being imaged and/or distorting parameters, it can be difficult and time consuming to find where on the reference image to begin a correlation to find a correction to be used to match known features of the reference image to found or identified features of the incoming strip.

It was realized that, except for gross errors (e.g. high rates of change or very fast excursions), the registration of the incoming strip of any given frame is likely to be close to the last recorded position of the most recently processed frame which came before. That is, while knowledge of the entire frame registration is insufficient to correct an entire frame for the reasons described hereinabove (e.g. does not correct for registration changes during the time period of the acquisition of the frame), such total frame registration data is good enough for purposes of identifying an approximate correlation between the present frame and a matching location (e.g. a matching strip) of the reference image. One aspect of the solution according to the new method is that following the acquisition of each strip, one registration parameter from the previous frame can be used to make a high speed identification of which reference strip to choose on the reference image for performing a detailed comparison between the strip of the reference image and the incoming strip. However, in practice, the strips themselves are not literally compared to each other, rather a two dimensional FFT of the appropriate reference strip is compared to a two dimensional FFT of the most recent incoming strip. Moreover, the comparison is typically performed by a cross-correlation operation, although any suitable comparison process can be used. Thus, a significant improvement in efficiency is gained by "knowing" about where to look on the reference frame. In practice, and as described in more detail hereinbelow, there can be pre-stored two dimensional FFT results for the strips (and/or sub-strips) of the reference image, so the calculations with respect to a reference image only need be performed once and then can be stored in memory for relatively fast retrieval.

Thus, in general terms, in one exemplary embodiment, the new method acquires a reference image and divides it into strips and/or sub-strips. A two dimensional FFT is performed once for each strip and/or sub-strip and stored in memory. As later target frame images arrive, they can be processed strip-by-strip. A two dimensional FFT can be performed on each incoming strip and compared, for example, by cross-correlation to the best estimate of the corresponding two dimensional FFT of the corresponding strip of the reference frame as chosen based on the registration of a particular strip (typically the center strip) of the frame which came before.

Further, as also described in more detail hereinbelow, where there is a very large or very fast registration error which, for example, can move the incoming strip entirely out of the area extent of the reference frame image, the new method discards the strip as well as the entire frame of that incoming strip as not useable for later combination into a final (e.g. averaged) image. Also, there can be situations where a given strip is not corrected, however, the remaining strips of the frame can be corrected and the frame can still be used and is not discarded.

It was further realized that where longer time periods can be used for somewhat slower updates of adaptive systems, more robust systems can perform the same calculations for two or more combined strips. Alternatively, the size of the strips can be increased for fewer corrections per for frame (with faster processing due to less calculations), or similarly, narrower strips can be used which cause more calculations per target frame, however advantageously yield more registration updates per frame (e.g. for faster updates of adaptive hardware). A larger strip can also be achieved by combing multiple strips in one of two different ways: with or without overlap. The case without overlapping is $(s\_1, s\_2) \rightarrow S\_1$, $(s\_3, s\_4) \rightarrow S\_2, \ldots$ Or, in the case of with overlapping can be $(s\_1, s\_2) \rightarrow S\_1, (s\_2, s\_3) \rightarrow S\_2, (s\_3, s\_4) \rightarrow S\_3, (s\_4, s\_5) \rightarrow S\_4, \ldots$ The process can handle both cases of with and without overlapping for different applications.

General concepts are now described before a more detailed description of the new system and method.

Image Registration: A typical procedure for image registration performed using methods of the prior art includes the steps of: A) Choose a reference frame, and divide it into several strips because of image distortion. B) Get a target frame, also divide it into the same number of strips, and then run cross correlation between the reference strip and the target strip to calculate the motion of each target strip. C) Register the target frame to correct for undesired motion of the target strips. Implementation of step B is particularly important for determining the speed and accuracy of the cross-correlation process.

Existing solutions to step B are believed not to be accomplished in real-time. We define "real-time" to mean registration related processing accomplished during the acquisition of a frame. Therefore, prior art approaches do not launch image registration process until a whole frame is received by the host computer (e.g. a personal computer (PC)), are not performed in real-time.

Time delay in the relatively slow (non-real-time) frame-level registration of the prior art is generally related to significant latency in controlling external device such as scanners and/or tracking mirrors. The smallest latency is typically limited to the frame rate of an imaging system, for example, 33 milliseconds for a typical 30 frames/second system. Adding in the computational latency from a graphics processing unit (GPU), a central processing unit (CPU) and/or other computer processors, the total latency can increase to greater than 33 milliseconds. Therefore, prior art systems and methods are not fast enough to operate in real-time, because such systems are unable to register images, such as 512×512 images, faster than about 30 frames/second.

Another problem in creating a final image from a number of frames is that prior art methods have been unable to operate in "real-time". One difficulty in achieving real-time registration correction of incoming frames is frame rate combined with the relatively high volume of image data. What is needed is a system and method for real-time image registration. Also, what is needed is an efficient and realizable relatively low cost GPU based fast process for real-time accurate registration of warped images.

System and method for real-time image registration: A new real-time system and method includes a process which performs "true" real-time image registration as well as dramatically improving processing speed is now described. For "true" real-time image registration, the process launches the registration process as soon as a new strip is received by the host computer (e.g. a host PC), instead of waiting for a whole frame to be delivered before beginning the image registration process.

In one exemplary embodiment, a frame of image can be programmed to have multiple strips, for example, a 520×544 image can be sent from the device (typically and analog to digital converter (ADC)) to the host computer (typically a PC) in 34 strips (times) with strip size 520×16 pixels. Whenever a new 520×16 strip is received by the host PC, it will be sent to the GPU immediately for the process to calculate its motion.

Experimental results: In one series of exemplary experimental testing, a commercially available video card GPU was used. In benchmark testing using the GPU of an NVidia™ GTX560 GPU (available from the NVIDIA Corporation of Santa Clara, Calif.), the computational time was found to be about 0.17 millisecond. The dominant latency was determined to be caused by sampling of the 520×16 strip which takes about 1.0 millisecond on a 30 frames/second system. The total latency from input data to output motion (on a digital to analog converter (DAC)) was about 1.5 milliseconds. While 16 lines per strip has been used in some of the exemplary embodiments described herein, a strip can have any suitable number of lines, such as, for example, 8, 12, 20, 24 lines per strip. The strip size (e.g. 16 lines) as well as the number of merged multiple strips (e.g. 2 or 4 merged strips) to a large merged strip, such as can be used, for example, for cross correlation, are adjustable dependent on different applications. Any suitable number of merged strips can be used.

It was realized that the most efficient way to further reduce the sampling latency is to increase the frame rate of the imaging system. One of the problems was how to implement a GPU computer process that was able to achieve a computational time of 0.17 millisecond per strip. It was realized that most current solutions mixed parallel and serial processing on the GPU, and that there was busy data buffering occurring between GPU and the host PC.

It was further realized that in order to more efficiently use the available GPU computational capacity for real-time image registration:

1) The GPU should substantially do parallel processing only. Therefore, all existing serial processing should be converted into parallel processing on the GPU.

2) To the extent possible, busy data communication between GPU and the host PC should be avoided. Therefore, to achieve optimal speed, one will send raw data to the GPU only once, and have GPU perform the rest of the process in parallel processing, and typically return a minimum number of parameters from the GPU to the host PC, such as the three parameters: correlation coefficient, translations x and y, and, 3) GPU shared memory and/or texture should be used as much as possible, and GPU global memory should be avoided as much as possible.

Summary: As compared with the prior art, the system and method described herein is able to process 512×512 (or equivalent sized) warped images at 120 frames per second on a GPU, such as for example, the moderate powered NVIDIA GPU GTX560 from NVIDIA, which maintaining the same high accuracy of the prior art methods. The new solution is able to take full advantage of parallel processing features of GPUs, such as, for example, NVIDIA GPUs. Before the advance of the inventive techniques described herein, prior art methods are believed to have been limited to less than 30 frames/second using same type of hardware, such as, for example, the NVIDIA GPU.

One application for the new system and method is in the art of ophthalmology. One such system was described in the co-pending application, Ser. No. 61/879,961, REAL-TIME OPTICAL AND DIGITAL IMAGE STABILIZATION FOR ADAPTIVE OPTICS SCANNING OPHTHALMOSCOPY, filed Sep. 19, 2013, which application is incorporated herein by reference in its entirety for all purposes. Eye motion is a major impediment to the efficient acquisition of artifact-free high resolution retinal images with the adaptive optics scanning light ophthalmoscope (AOSLO). In the '961 application, we described a solution to this problem that combines both optical and digital image stabilization in an AOSLO by use of both a small field AOSLO and a wide field SLO (WFSLO). Using the inventive techniques of image registration described hereinabove, real-time image registration for image strips and images from the AOSLO and SLO can run at 30 frames/second or even 60 frames/second. Further, real-time control of a tracking mirror (an adaptive element having a controllable position) to remove large eye motion on the small field-of view AOSLO (1-2 degrees), by applying real-time eye motion signals from a large field-of view SLO (10-30 degrees) can be accomplished in one millisecond.

In related ophthalmological instrumentation, using the inventive techniques of image registration described hereinabove, removal of eye motion from optical coherence tomography (OCT) in high accuracy with millisecond latency can be accomplished by applying real-time eye motion signals from a large field-of-view SLO (5-10 degrees) on the scanners of the OCT.

Images from a scanning optical system usually contain distortions, particularly when the scanning field of view (FOV) is small. This distortion, accompanied with random motion in a sequence of continuous images, or videos, is further amplified in an adaptive optics scanning light ophthalmoscope (AOSLO) system for live retinas where the typical FOV is ~0.5-2 degrees and progressively scanning frame rate is as slow as ~25-50 Hz. In AOSLO for live human retinas, because the eye is constantly in motion; even during careful fixation, normal, involuntary, microscopic eye movements cause the scanned field of the AOSLO to move continuously across the retina.

Normal fixational eye movements have been classified by magnitude and frequency into three categories: drifts, tremor, and microsaccades. These motions cause unique distortions in each AOSLO video frame due to the relatively slow frame rate of AOSLO. In the normal eye, these movements tend to be relatively small in amplitude. However, in patients with retinal disease or poor vision, fixational eye movements can be amplified and can introduce large distortions that can be a major hindrance to efficient AOSLO imaging, in some cases precluding imaging altogether. Unfortunately, these patients are potentially some of the most interesting retinas to study using AOSLO technology. It is therefore desirable, particularly for clinical imaging, to minimize or eliminate this motion altogether.

Most, if not all clinical and most experimental uses of the instrument process raw AOSLO images according to the following steps: 1) de-warped (to remove sinusoidal distortions induced from the fast resonant scanner); 2) registered (to allow for several frames to be averaged); and 3) averaged (to increase SNR) to generate an image for qualitative or quantitative analysis. High quality image registration works by recovering the eye motion and nullifying the motion to generate high SNR images from AO image sequences.

The new method of the registration step described hereinabove is now described in more detail. The registration process uses a process which is capable of both 1) offline digital registration and 2) real-time optical stabilization with or without the combination of real-time digital registration.

FIG. 1 shows a graph which illustrates an exemplary involuntary human eye motion plotted versus time. The solid curve represents eye motion in an x direction, and the dashed line, eye motion in a y direction. FIG. 1 illustrates a typical involuntary human eye motion which moves in the patterns of drifts (without shaded areas), saccades or microsaccades, represented by the shaded areas labeled 1, and blinks represented by the shaded area with labeled 2.

Figure 2:
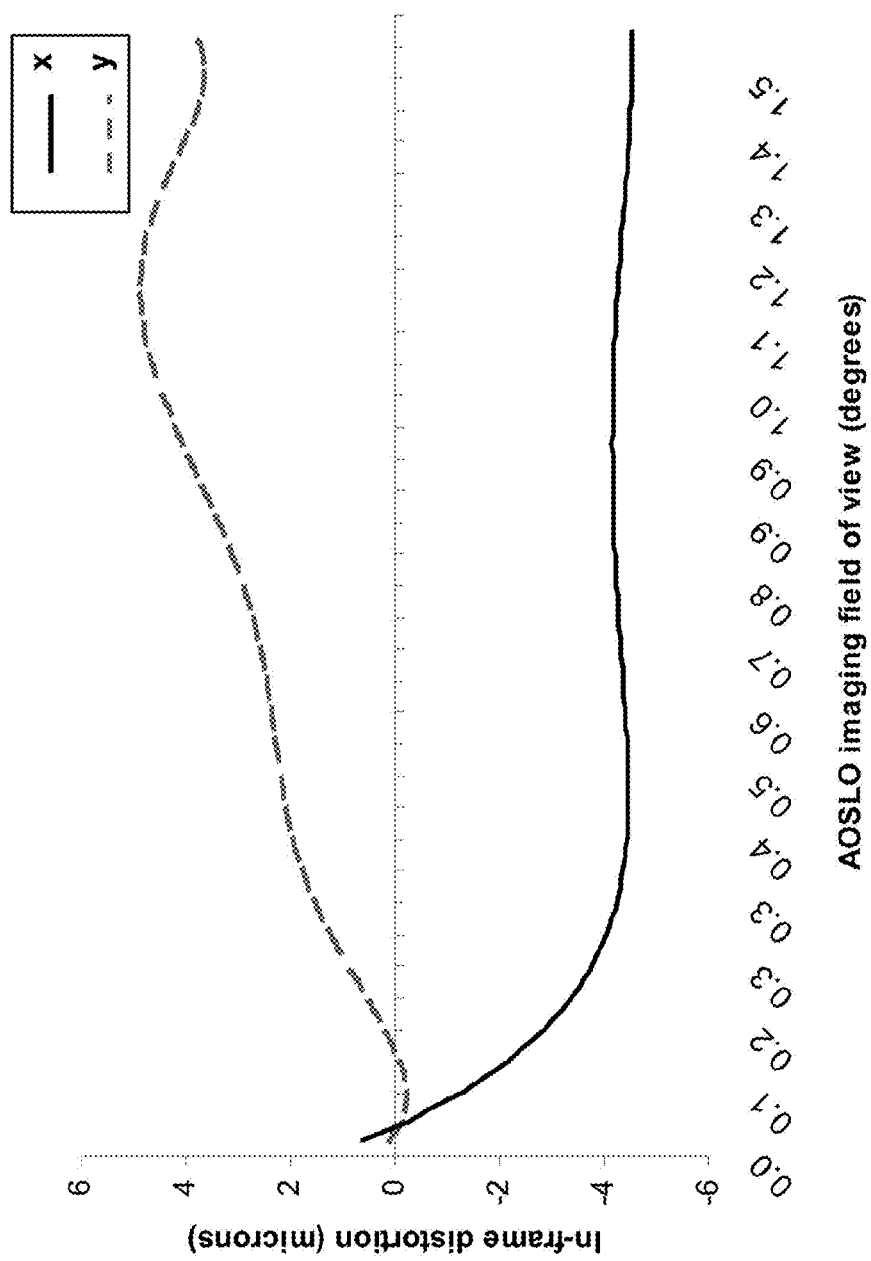
FIG. 2 shows a graph illustrating in-frame distortion of an AOSLO image.

FIG. 2 shows a graph which illustrates in-frame distortion of an AOSLO image. The graph shows a typical distortion inside a single AOSLO image as in-frame distortion plotted against AOSLO imaging field of view in degrees.

Now turning back to FIG. 1, in FIG. 1 only translation of eye motion is displayed, although rotation is also a typical motion from live human eyes. To solve the problems of eye motion with in-frame distortion, the sections below introduce a new fast and robust process with the following capabilities: 1) compensation for eye motion, including drifts, saccades, blinks, and microsaccades; 2) the process is able to detect and compensate for drifts and microsaccades; 3) the process is able to detect saccades and blinks, but unable to compensate for saccades and blinks; 4) however, the process is able to re-lock the new eye location after a saccade or a blink; 5) the process can be economically implemented on either on a commercial available computer graphics card, such as, for example, the NVidia™ Graphics Processing Unit (GPU) or a PC-CPU with one or multiple processing units, such as for example, one or more multi-core processors which can support parallel processing.

The process is image based, where in some embodiments, the software automatically chooses a reference frame and/or in other embodiments, a software operator can manually choose a reference frame and the software registers the rest frames in a video sequence to this reference frame.

In some embodiments, such as systems which include adaptive imaging (e.g. adaptive optics), the process is capable of working in real-time mode where motion data (e.g. eye motion data) from the process can be sent to one or multiple control devices, e.g., one or more fast steering mirrors and rotational stages to dynamically update status of these external devices so that they track position of the eye in real time.

The real-time mode has been implemented and tested using a NVidia™ GPU GTX560 (available from NVidia™ of Santa Clara, Calif.) with the possibility of being migrated to a PC-CPU with one or more processing units in the future.

In some embodiments, a real-time mode for controlling external devices, the process can work either in closed loop for high robustness or open loop for high speed control.

In other embodiments, an offline or post-processing mode can run either on a video card, such as, for example, the NVidia™ GPU or on any suitable computer, such as, for example a PC-CPU.

In some embodiments, during the detection of eye motion, the process runs the same procedures with either real-time model or offline mode. In some embodiments, the process is implemented with FFT-based cross correlation. In other embodiments, the new process described herein can be implemented with spatial domain cross correlation as well.

Detection of eye drifts, saccades, blinks, and microsaccades is now described in more detail.

Figure 3:
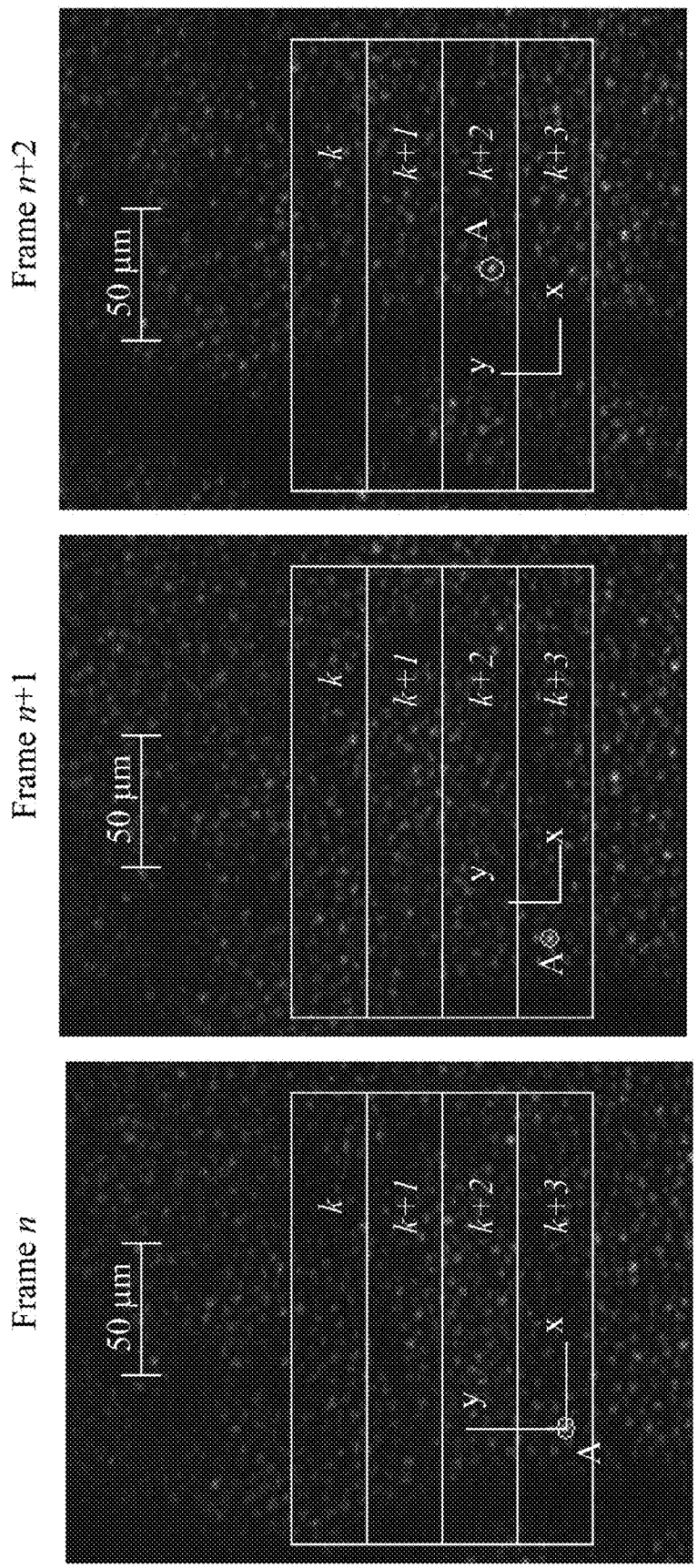
FIG. 3 shows three successive exemplary frames of a surface within the eye.

FIG. 3 shows three successive exemplary frames, frame n, frame n+1, and frame n+2, of an imaged surface within the eye. Beginning with the detection of eye drifts, to resolve the issue of eye motion and in-frame distortion, the process divides each of the whole frames (n, n+1, and n+2) into multiple strips (k, k+1, k+2, k+3) as shown in each of the rectangles of FIG. 3. Typically, there would be more than 4 strips, however here we use four strips for simplicity in illustrating the problems associated with eye drift. The 'x-y' coordinate system shows the physical location of an imaging area on the actual surface which is the same surface shown in all three frames. The feature labeled 'A' has been captured from the retina, and moves to different imaging locations in the different frames due to eye motion.

From FIG. 3 it can be seen that a cross correlation between strip k+3 of Frame n and k+3 on Frame n+2 would return an incorrect translation because there is no overlapped of the data between these two strips. By no overlap, we mean that the reference feature A of strip k+3 in frame n has drifted out of strip k+3 in frame n+2 to strip k+2. Therefore correlation between the two respective strips k+3 can no longer produce useful registration information based on feature A alone. In such situations, one traditional approach increases the strip size so that the two strips have at least a half area overlapped, but at the cost of computation $KO(N\log_2 N)$ where K is the number of strips and N is related directly to the strip size. When the feature 'A' moves further away against the same feature 'A' on the reference frame, the strip size increases dramatically and the computational cost $KO(N\log_2 N)$ slows down the process simultaneously.

By contrast the new process described herein keeps the same strip size substantially the same, for all frames. Strip size can be determined by the eye motion from any two consecutive frames. In an eye drift mode, eye motion from any two consecutive frames, typically excluding the cases of saccade, blink or microsaccade, is statistically the same from an individual human subject. These motions are significantly smaller than the motions between the reference frame and most of the target frames.

Figure 4:
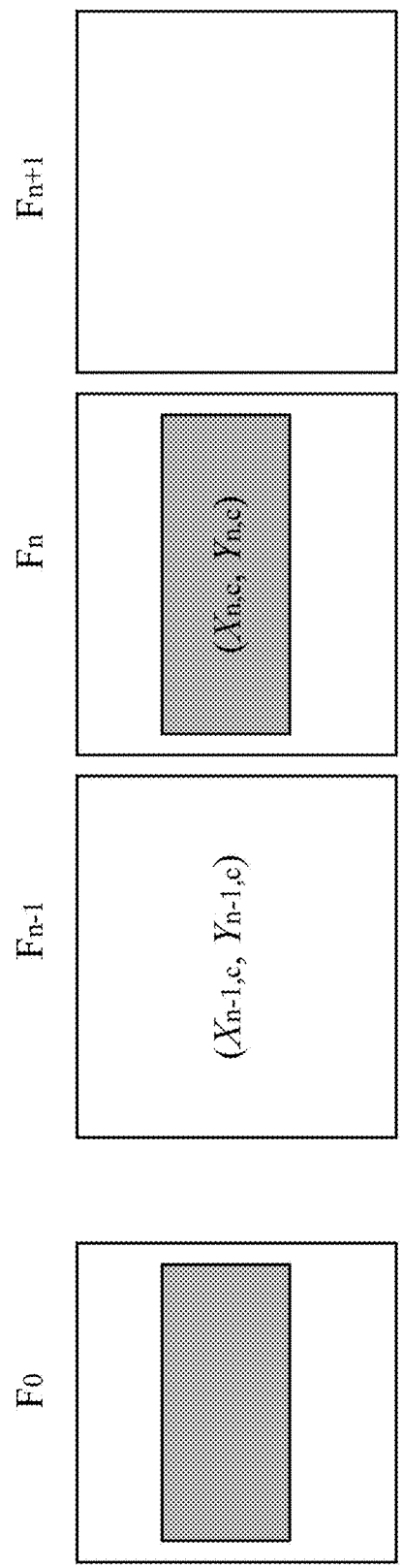
FIG. 4 shows a series of exemplary image frames illustrating the calculation of an offset in frame Fn according to one embodiment of the new process.

FIG. 4 illustrates the calculation of an offset in frame $F_n$ (detection of motion) for use in the correction of the eye motion of the target frame $F_{n+1}$ according to one embodiment of the new process. To run a fast and robust strip-level cross correlation between any two frames (e.g., the reference frame $F_0$ and the target frame $F_{n+1}$ of FIG. 4, the exemplary process performs the following steps:

A) The process calculates frame motion of the previous frame $F_n$. In some preferred embodiments, the frame motion of the previous frame $F_n$ is calculated from the center of this frame, by just one set of $(X_{n,c}, Y_{n,c})$.

B) $(X_{n,c}, Y_{n,c})$ is calculated from cross correlation between one central strip at frame $F_0$ and the other central strip from frame $F_n$ with offset $(X_{n-1,c}, Y_{n-1,c})$ from its previous frame $F_{n-1}$.

C) $(X_{n,c}, Y_{n,c})$ can alternatively be calculated from an average of the motions of several to all of the strips of frame $F_n$.

D) With the assistance of the offset $(X_{n-1,c}, Y_{n-1,c})$ the strip size, thus the computational cost, as contrast with comparing the entire frames of $F_0$ and $F_n$ is significantly reduced.

E) The central strip from $F_0$ is cropped from the same location for all $(X_{k,c}, Y_{k,c})$, k=1, 2, 3, with FFT-based cross correlation in the form of:

$$A = fft2(R) * conj(fft2(T)) \quad (1), \text{ and}$$

$$B = ifft2(A) \quad (2)$$

where R is the reference strip and T is the target strip, the 2D Fourier Transform fft2(R) remains the same for all cases. Thus the process only runs fft2(R) one time for all the target strips. In preferred embodiments, to speed up the computation, fft2(R) can be pre-loaded to a CPU or GPU at the beginning of the registration process and is not changed until the reference frame is updated by a new one.

F) Calculation of $(X_{n,c}, Y_{n,c})$ is typically performed at the end of the current frame and before the next frame is received.

G) Once $(X_{n,c}, Y_{n,c})$ is obtained, the process calculates motions of multiple strips from the target frame with the offset $(X_{n,c}, Y_{n,c})$ as illustrated in FIG. 4, where frame $F_{n+1}$ is moved according to the location of $(X_{n,c}, Y_{n,c})$. Due to the whole frame motion, not all strips from the target frame have overlapped area with their relative strips on the reference frame. The strip motions are defined as (Xn+1,1, Yn+1,1), (Xn+1,2, Yn+1,2), (Xn+1,3, Yn+1,3), ..., (Xn+1,k, Yn+1,k) where the results are calculated with the offset from (Xn,c, Yn,c), where k is the number of strips.

H) The approach of the preceding steps efficiently reduces strip size as long as the strip size is large enough to cover the eye motion between the two consecutive frames $F_n$ and $F_{n+1}$.

I) To further reduce computational cost using the same cross correlation of Eq. (1) and Eq. (2), fft2( ) of all strips in $F_0$ remains the same for all frames. The results are typically pre-loaded to the CPU or GPU at the beginning of registration and are not changed until the reference frame is updated by a new one.

Figure 5:
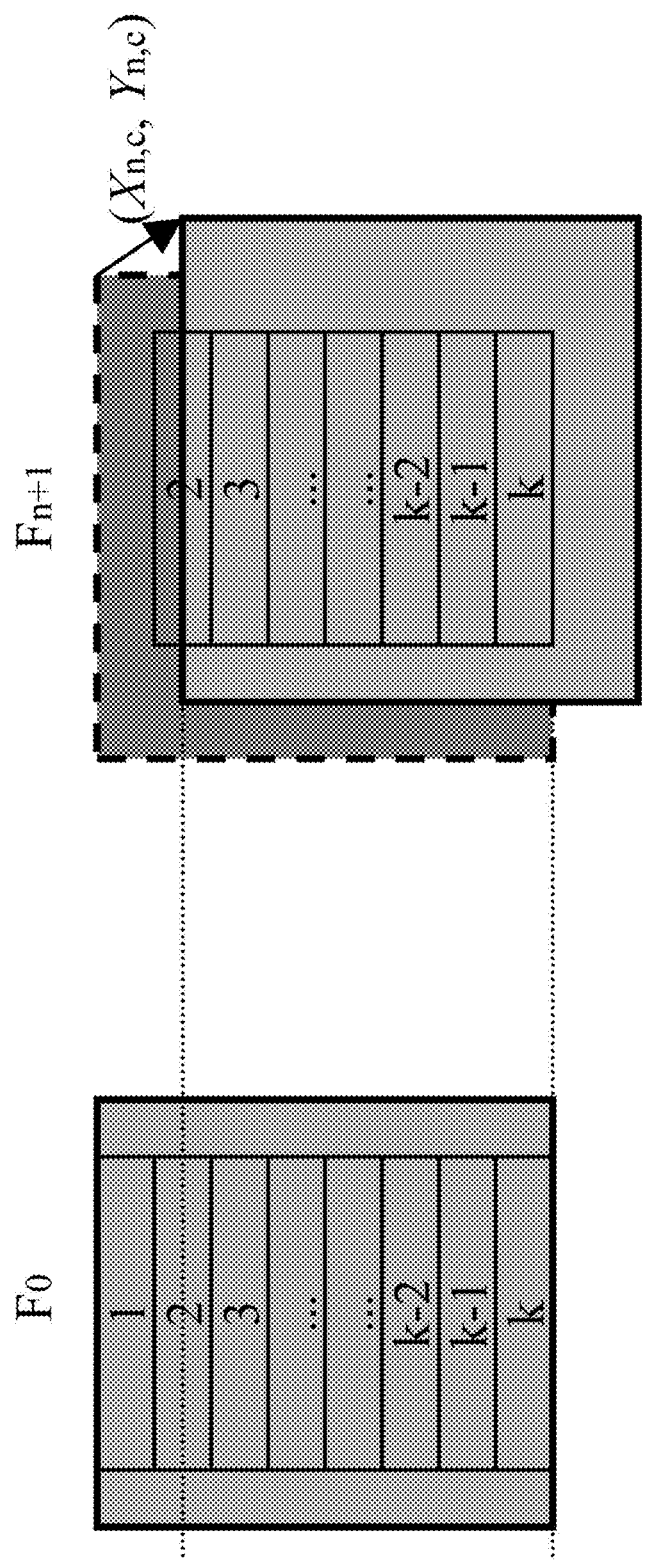
FIG. 5 shows an illustration of a reference frame compared with a later frame having an offset.

FIG. 5 shows an illustration of a reference frame $F_0$ and a later frame $F_{n+1}$ offset by $(X_{n,c}, Y_{n,c})$ calculated from the frame before, $F_n$. The detection of eye motions from the center strip of frame $F_n$ can thus be used to correction the multiple strips of frame $F_{n+1}$.

J) Optimized strip sizes for the examples of FIG. 4 and FIG. 5 can be different.

Figure 6:
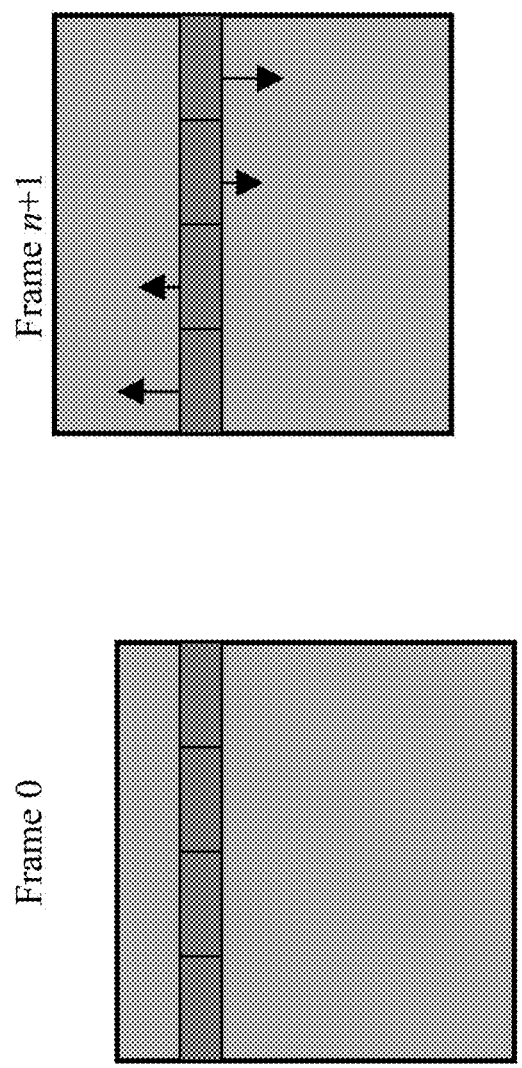
FIG. 6 shows an illustration of a frame having a strip further divided into multiple sub-strips.

K) FIG. 6 shows an illustration of multiple sub-strips used to detect and later correct for rotation of the surface being imaged (e.g. eye rotation). In the exemplary eye motion of FIG. 6, four sub-strips of a strip k are considered. A comparison of the same sub-strips between the reference frame $F_0$ and the later frame $F_{n+1}$ shows that the two sub-strips on the left side of the strip have moved up and the two sub-strips on the right side of the strip have moved down indicating a clockwise rotation of the image.

Detection of saccades, blinks and microsaccades: Saccades, blinks and microsaccades happen on all live human eyes. Detection of saccades, blinks and microsaccades can be based on the criteria when any consecutive two frames have, where: the relative motion is larger than a user specified threshold value (a motion threshold), or a coefficient of their cross correlation drops below a user specified threshold value. These two thresholds vary with different subjects. These thresholds are also different for the detection of saccade and blink and for the detection of microsaccade.

After a relatively large motion, such as, for example, a saccade or a blink, the eye can move to any possible location. In a small FOV AOSLO system, the eye can move totally out of the imaging area of the reference frame. One recovery process solution is to increase the strip size (e.g. increase the strip size of FIG. 4) to the whole frame (e.g. an entire target frame), for both the reference frame and for the target frame. By temporarily increasing the strip size to the entire frame to probably of finding common features or targets is increased, and there is a maximum possibility of overlap between the reference frame and the target frame. After a saccade or a blink is detected, the process can temporarily abandon detection of strip motion and temporarily dedicate most of the available computational power to a whole frame cross correlation.

Re-lock of eye position after a detected motion such as a saccade or a blink: In a real-time system for imaging the eye, eye position is re-locked after a saccade or a blink. For example, in a small FOV AOSLO system, re-locking becomes problematic since the new frames can move completely out of the mapping range of the reference frame. This situation can be referred to as a 'frame-out'. Image-based cross correlation has no solution for the issue 'frame-out'. Fortunately, such as with the assistance of fixation target, most eyes will move back to locations close to the reference location. Under this situation, in order to re-lock eye position as soon as possible, the process can open the strip size (e.g. the strip size of FIG. 4) to the whole frame to cover eye motion to the extent possible for the working FOV. As a consequence, the computational cost can dramatically increase due to the increase of N in O(Nlog$_2$N). Thus, in some embodiments, we down sample the image, such as, for example, to a half of its size, by sampling alternative pixels or binning 2×2 pixels to 1 pixel. This reduces computation cost by a factor of 4 log$_2$4=8, which reduces computational accuracy to 2 pixels. Fortunately, the result of frame motion $(X_{n,c}, Y_{n,c})$ is used to fine adjust strip motions only. Therefore, the accuracy of $(X_{n,c}, Y_{n,c})$ does not significantly degrade the accuracy of strip motions. This down sampling could be 3×3 or more dependent on different applications. For the same reason, FFT{R} stays the same throughout the whole sequence hence only two times of FFT's are needed as well under this situation.

To reduce computation of the whole frame cross correlation, in some embodiments, the process down samples the frame size by binning multiple pixels to one pixel or regularly picking one pixel out of multiple pixels. This down sampling reduces the accuracy of $(X_{n,c}, Y_{n,c})$, but $(X_{n,c}, Y_{n,c})$ is used to fine tune motions of multiple strips (e.g. in FIG. 5) and therefore does not degrade the accuracy of (Xn+1,1, Yn+1,1), (Xn+1,2, Yn+1,2), (Xn+1,3, Yn+1,3), ..., (Xn+1,k, Yn+1,k) (results are calculated with the offset from (Xn,c, Yn,c). Xn,1, Yn,1), (Xn,2, Yn,2), (Xn,3, Yn,3), ..., (Xn,k, Yn,k) are calculated from the offset of (Xn−1,c, Yn−1,c)).

Implementation of the process in a real-time system: In a real-time system, schedule of timing is carefully considered. For example, when the strip motions from exemplary FIG. 5 and FIG. 6 are sent to external devices sequentially, the process should ensure that the current computation has finished before going on to calculate the motion of the next strip. In a real-time system, an image is sent from a digitizer (e.g., from an analog to digital converter (ADC)) strip-by-strip, instead of frame by frame, such as was the traditional way of the prior art. With such strip-level technology, the external devices can be updated at the rate of k*F Hz, where k is the number of strips per frame and F is the frame rate. With such a boosted rate, the external devices can run more efficiently.

The new system and method to control of strip-level data acquisition was implemented using a Xilinx field programming gate array (FPGA) device ML506, ML605, KC705 or VC705 (available from the Xilinx Corporation of San Jose, Calif.). Those skilled in the art will appreciate that any suitable type of programmable device and/or computer can be used to perform the new image processing techniques described herein. For example, it is contemplated that the new processes described herein will continue to be useful in the art beyond the manufacturing life of any particular FPGA or processor.

In some embodiments, detection of saccades, blinks, or microsaccades can be placed at the end of the current frame and before the next frame arrives. This period before the next frame arrives is usually the time period during which the slow scanner in an AOSLO instrument is retracing without having active data acquisition. When the external devices work in such a closed loop, the process can calculate residual image motion, because the external devices dynamically optically track position of the eye. To make the motion of the external devices smoother, sub-pixel cross correlation as illustrated in FIG. 5 can be implemented.

Discrimination process for averaging multiple images: After all frames have been optically stabilized and digitally registered according to the processes described hereinabove, the process may still not have properly corrected for all of the eye motion, due to factors such as random noise and distortions beyond translation and rotation. To average multiple optically stabilized and digitally registered frames, in some embodiments, the process can also sweep through each frame with a second round of cross correlation on multiple strips to eliminate with spurious motions. After such further optical stabilization and digital registration, frame to frame motion is typically less than 1 pixel. The computational cost for this additional discrimination process is significantly less than the computations made in FIG. 4 and FIG. 5. In a real-time system, such an additional discrimination process can be placed at the end of the current frame, after the process has finished the computation in FIG. 4.

Figure 7A:
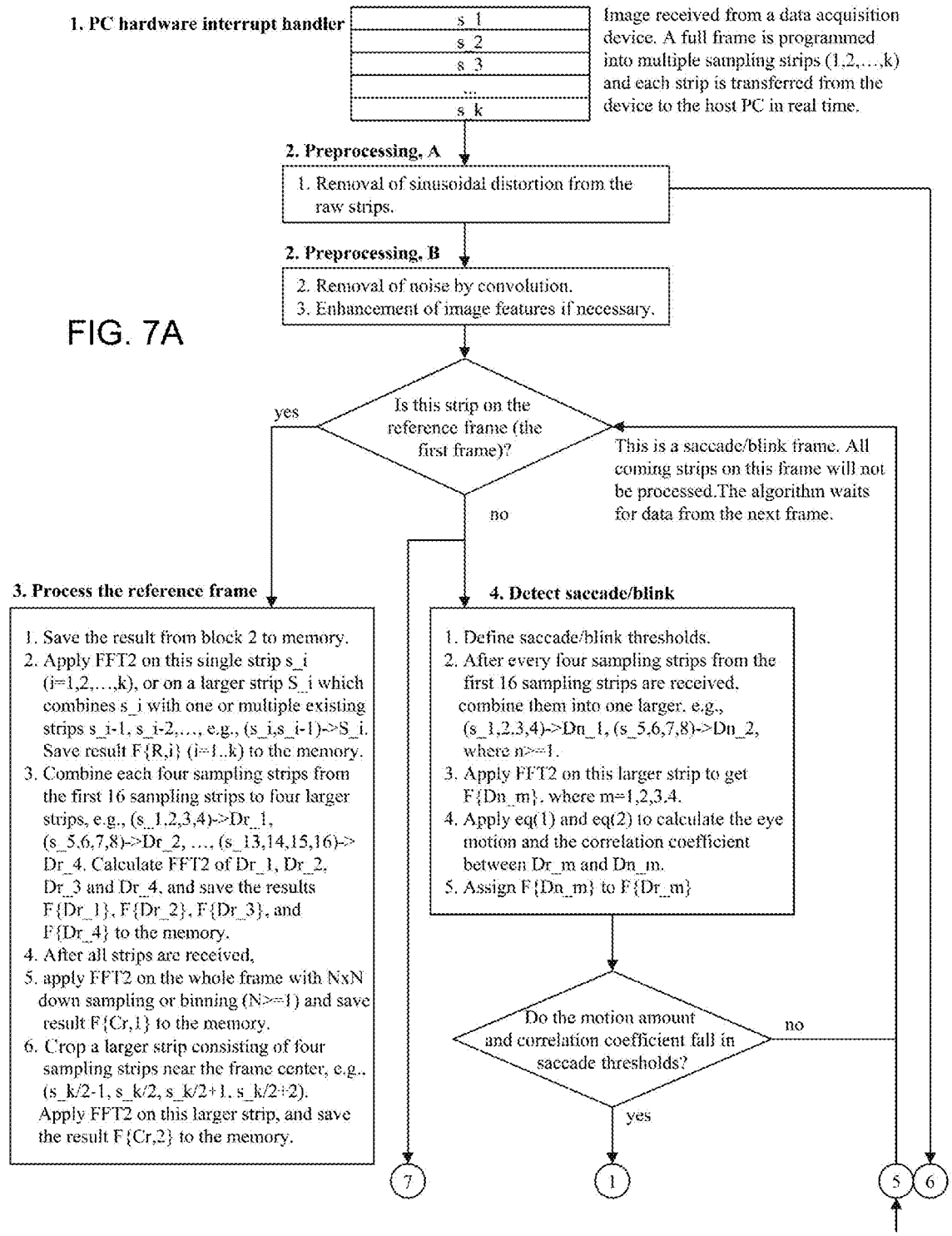
FIG. 7A shows a first page of a detailed flow chart for one embodiment of the new method for real-time image registration.
Figure 7B:
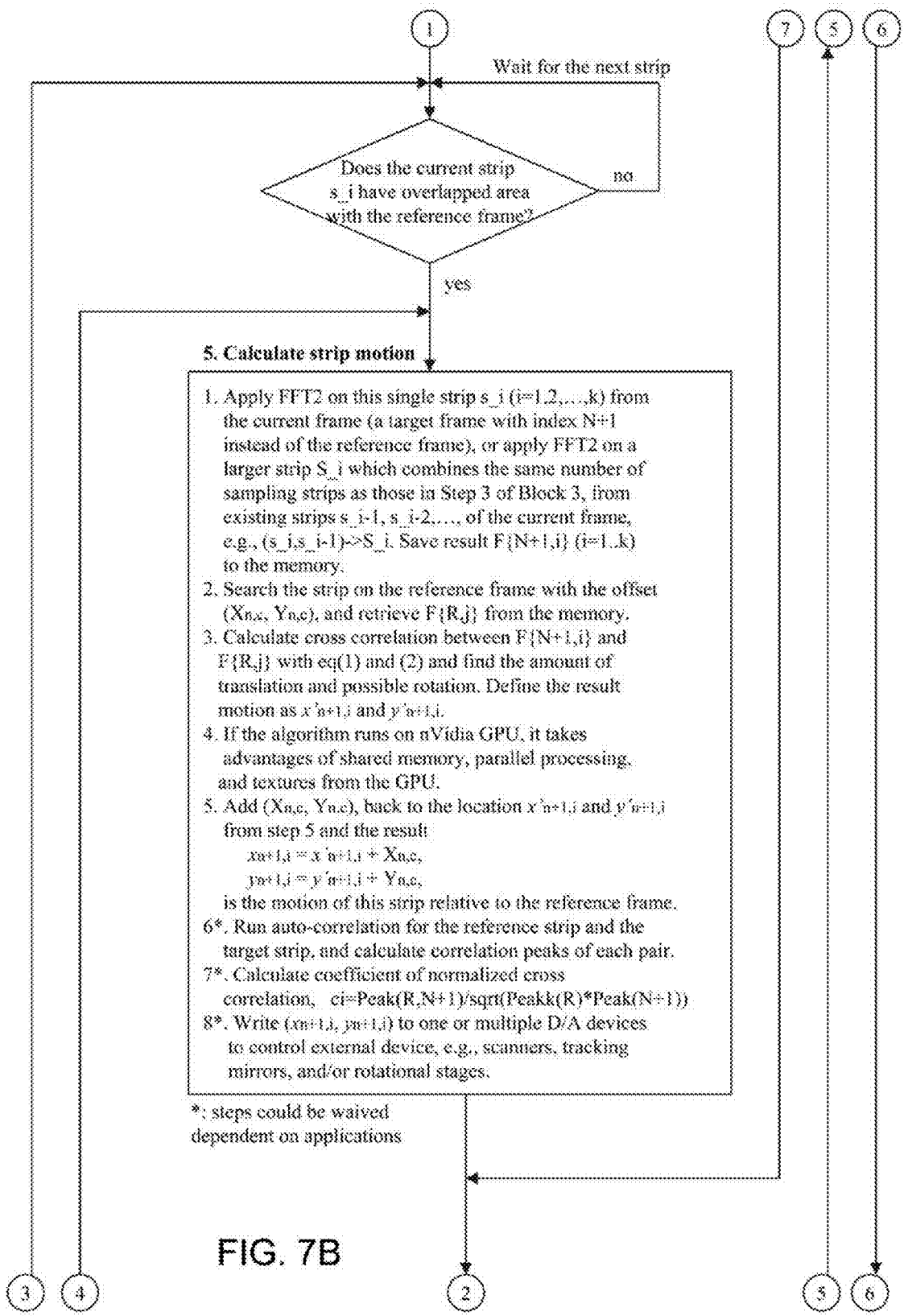
FIG. 7B shows a second page of the flow chart of FIG. 7A.
Figure 7C:
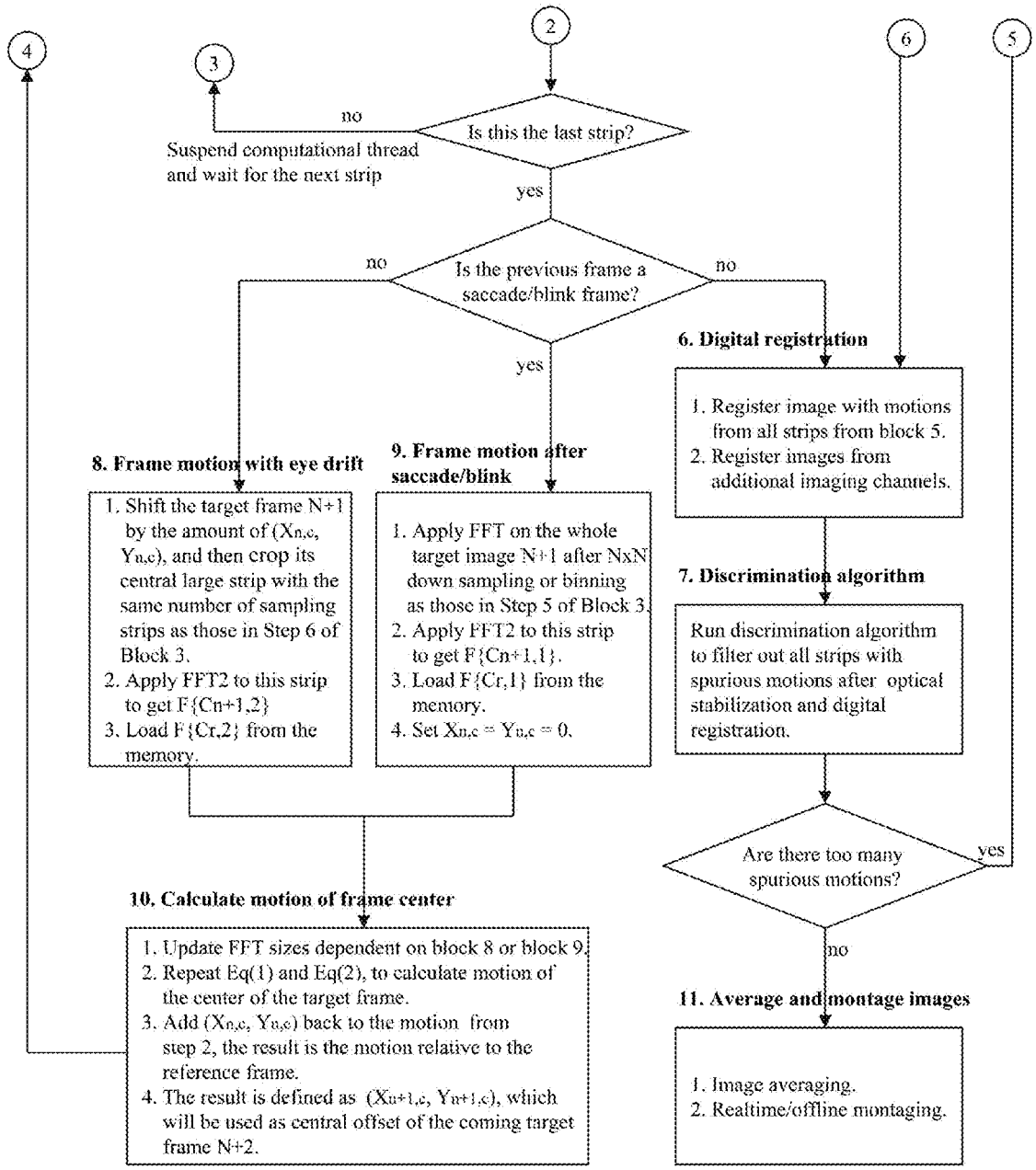
FIG. 7C shows a third page of the flow chart of FIG. 7A.

Example: FIG. 7A, FIG. 7B, and FIG. 7C show a flow chart of one embodiment the new process described hereinabove. Following the scheme of the new method as described hereinabove, in block 1, an image is received from a data acquisition device, such as for example, an AOSLO instrument. FIG. 7A, FIG. 7B, and FIG. 7C show in detail how the new process is programmed to process each image frame as a series of received strips. In case of an AOSLO apparatus, the width of each strip is defined by some number of scan lines. Where the data acquisition device is an imager returning frames of pixelated width (e.g. a CMOS imager), the equivalent to a number of scan lines would be some width as determined by a number of pixels.

In the exemplary implementation of FIG. 7A, block 1 begins by a PC hardware interrupt handler indicating the arrival of a new image frame data. The image is received from a data acquisition device. A full frame is programmed into multiple strips and each strip is transferred from the device to the host PC in real time. The number of strips programmed per frame can be influenced by factors such as I/O latency and computational cost. One aspect of the new method is that strips can be processed as they are received. The process need not wait for receipt of an entire image frame, but rather can begin running as soon as the first strip is received. An image is received from a data acquisition device. A hardware interrupt, such as, for example, a PC hardware interrupt handler, can indicate that an image frame is ready to be received, or is being received from the data acquisition device (e.g. an AOSLO apparatus). The full frame is programmatically spit into multiple sampling strips (1, 2, . . . , k) and each strip is transferred from the device to the host PC in real time.

In block 2, any preprocessing steps typical to a given image processing can be performed before image registration according to the new method. For example, in AOSLO ophthalmic applications, typically preprocessing includes: 1) Removal of sinusoidal distortion from the raw strips (e.g. de-warping); 2) Removal of noise by convolution, and 3) Optional enhancement of image features as might be indicated for a specific imaging situation.

The process compares each incoming strip of the incoming image frame to a corresponding strip of a reference frame. In its real-time embodiments, typically the first incoming frame is used to create the reference frame. If the incoming image frame of strips is the first image frame, in block 2, this first image frame is processed to generate the reference frame data.

Processing a reference frame image: According to the exemplary process of FIG. 7A, block 3, the reference frame is processed as follows: 1) Save the result from pre-processed data from block 2 to GPU or PC-CPU memory; 2) Apply FFT2 on this single strip $s\_i$ ($i=1, 2, \ldots, k$), or on a larger strip $S\_i$ which combines $s\_i$ with one or multiple existing strips $s\_i-1, s\_i-2, \ldots$, e.g., $(s\_i,s\_i-1)\rightarrow S\_i$, with or without overlapping. Save result $F\{R,i\}$ ($i=1 \ldots k$) to the memory; 3) Combine each four sampling strips from the first 16 sampling strips to four larger strips, e.g., $(s\_\mathbf{1,2,3,4})\rightarrow Dr\_\mathbf{1}$, $(s\_\mathbf{5,6,7,8})\rightarrow Dr\_\mathbf{2}, \ldots, (s\_\mathbf{13,14,15,16})\rightarrow Dr\_\mathbf{4}$. Calculate FFT2 of $D\_\mathbf{1}$, $Dr\_\mathbf{2}$, $Dr\_\mathbf{3}$ and $Dr\_\mathbf{4}$, and save the results $F\{Dr\_\mathbf{1}\}$, $F\{Dr\_\mathbf{2}\}$, $F\{Dr\_\mathbf{3}\}$, and $F\{Dr\_\mathbf{4}\}$ to the memory; 4) After all strips are received, 5. apply FFT2 on the whole frame with N×N down sampling or binning (N>=1) and save result $F\{Cr, \mathbf{1}\}$ to the memory; 6) Crop a larger strip consisting of four sampling strips near the frame center, e.g., $(s\_k/2-1, s\_k/2, s\_k/2+1, s\_k/2+2)$, and apply FFT2 on this larger strip, and save the result $F\{Cr,\mathbf{2}\}$ to the memory.

Following the processing of the reference frame in block 3, successive target frames, after block 2 pre-processing, are first checked for a situation that might cause the registration of the strip to be impractical or impossible. For example, in ophthalmic applications some rapid eye motions such as, for example, saccade or blink can cause a particular frame to be unsuitable for inclusion in a final image created from multiple frame images. For example, in block 4, Detect saccade/blink, the process can detect a saccade or blink situation by analyzing a strip according to the following steps: 1) Define saccade/blink thresholds; 2) After every four sampling strips from the first 16 sampling strips are received, combine them into one larger, e.g., $(s\_\mathbf{1,2,3,4})\rightarrow Dn\_\mathbf{1}$, $(s\_\mathbf{5,6,7,8})\rightarrow Dn\_\mathbf{2}$, where $n>=1$; 3) Apply FFT2 on this larger strip to get $F\{Dn\_m\}$, where $m=1,2,3,4$; 4) Apply eq(1) and eq(2) to calculate the eye motion and the correlation coefficient between $Dr\_m$ and $Dn\_m$; and 5) Assign $F\{Dn\_m\}$ to $F\{Dr\_m\}$. If a saccade or blink is detected, the strips of the current frame are considered unusable. As a saccade/blink frame, the frame is skipped. That is, all incoming strips for the saccade/blink frame will not be processed, and the process waits for data from the next frame.

If the strip of the frame being processed makes it past block 4, meaning the strip is not a saccade/blink frame and is usable, one more check is to check for overlap with the reference frame. If there is insufficient overlap with a corresponding strip of the reference frame, the frame is still unusable. However no registration correction can be calculated for this particular strip. Therefore, the strip registration process waits for data from the next incoming frame.

If there is sufficient overlap of this latest incoming strip with a corresponding strip of the reference frame, then block 5 calculates the motion of the strip by the following steps: 1) Apply FFT2 on this single strip $s\_i$ ($i=1, 2, \ldots, k$) from the current frame (a target frame with index N+1 instead of the reference frame), or apply FFT2 on a larger strip $S\_i$ which combines the same number of sampling strips as those in Step 3 of Block 3, from existing strips $s\_i-1, s\_i-2, \ldots$, of the current frame, e.g., $(s\_i,s\_i-1)\rightarrow S\_i$ with or without strip overlapping. Save result $F\{N+1,i\}$ ($i=1 \ldots k$) to the memory; 2) Search the strip on the reference frame with the offset $(Xn,c, Yn,c)$, and retrieve $F\{R,j\}$ from the memory; 3) Calculate cross correlation between $F\{N+1,i\}$ and $F\{R,j\}$ with eq(1) and (2) and find the amount of translation and possible rotation. Define the result motion as x'n+1,i and y'n+1,i; 4) If the algorithm runs on nVidia GPU, it takes advantages of shared memory, parallel processing, and textures from the GPU; 5) Add (Xn,c, Yn,c), back to the location x'n+1,i and y'n+1,i from step 5 and the result xn+1,i=x'n+1,i+Xn,c, yn+1,i=y'n+1,i+Yn,c, is the motion of this strip relative to the reference frame; optional step 6) Run auto-correlation for the reference strip and the target strip, and calculate correlation peaks of each pair; optional step 7) Calculate coefficient of normalized cross correlation, ci=Peak(R,N+1)/sqrt(Peakk(R)*Peak(N+1)); options step 8) Write (xn+1,i, yn+1,i) to one or multiple D/A devices to control external device, e.g., scanners, tracking mirrors, and/or rotational stages. The optional steps 6, 7, and 8 may depend on specific applications of the process, such as, for example, whether the process is being used for image registration alone, or also to control active control devices (e.g. active correction mirrors).

Processing one or more target frame strips: The processed described hereinabove can be repeated until the last strip of an image frame is received and processed by block 5 (assuming the frame was not discarded as a saccade/blink frame). Following the last frame, still assuming the frame was not a saccade/blink frame, the frame motion can be calculated in block 8, such as frame motion caused by normal expected eye drift according to the following steps: 1. Shift the target frame N+1 by the amount of (Xn,c, Yn,c), and then center its central large strip with the same number of sampling strips as those in Step 6 of Block 3; 2) Apply FFT2 to this strip to get F{Cn+1,2}; 3) Load F{Cr,2} from the memory.

In the event that the current frame being process turned out to be a saccade/blink frame, the process can recover using the following steps: 1. Apply FFT on the whole target image N+1 after N×N down sampling or binning as those in Step 5 of Block 3; 2) Apply FFT2 to this strip to get F{Cn+1,1}; 3) Load F{Cr,1} from the memory; and 4) Set Xn,c=Yn,c=0.

Finally, in block 10, the motion of the frame center is calculated by the steps: 1) Update FFT sizes dependent on block 8 or block 9; 2) Repeat Eq(1) and Eq(2), to calculate motion of the center of the target frame; 3) Add (Xn,c, Yn,c) back to the motion from step 2, the result is the motion relative to the reference frame; 4) The result is defined as (Xn+1,c, Yn+1,c), which will be used as central offset of the coming target frame N+2.

While block 10 completes the real-time process for the most recently received strip of the incoming image frame, related processes which can be done in real-time or less than real-time, are show beginning with block 6, digital image registration. The steps block 6, digital image registration can include: 1) Register image with motions from all strips from block 5; 2) Register images from additional imaging channels. Following, block 6, a block 7 discrimination process can be run to filter out one or more strips with spurious motions after optical stabilization and digital registration. If there are too many spurious motions, the frame can be discarded, otherwise, in block 11, a final image can be generated by averaging and/or creating a montage of images by the steps of: 1) Image averaging; and/or 2) Real-time/offline montaging.

While the detailed example of the flow chart of FIG. 7A, FIG. 7B, and FIG. 7C was implemented and optimized for image registration related to ophthalmic applications, it will be understood by those skilled in the art that the new registration techniques described hereinabove are useful for real-time processing of any suitable type of incoming image frame that can be so divided into strips of any suitable size. For example, as described further hereinbelow, these strip based techniques for real-time image frame registration are also believed to be particularly well suited for use in real-time image processing of frames received from satellites and other types of remote sensing image applications performed by, for example, remotes sensing vehicles, such as remotely piloted vehicles and aircraft.

Exemplary suitable computer hardware/software environment: GPU and CPU implementations of the stabilization algorithm: The approaches for eye detection described hereinabove can be used for both real-time processing and fast offline image registration. We have implemented such techniques using both a NVidia™ GPU and a PC-CPU but the PC-CPU version is used for offline only. The implementation on NVidia™ GPU employed typical CUDA parallel processing technologies with the applications of CUDA FFT, CUDA shared memory, and CUDA textures (CUDA is also available from NVidia™ of Santa Clara, Calif.). Modern GPU and CPU usually have several Gigabytes of memory, while the algorithm above uses about 2 to 3 Megabytes.

In a real-time system, motion from each strip, a sampling strip, needs to be sent to the stabilization mirror immediately to achieve smallest latency. For example, if the sampling strip interval is 1 millisecond, the stabilization mirror will be updated at 1 kHz. In our implementation, we set each sampling strip to have 16 lines which corresponds to ~1.1 millisecond on our AOSLO system. 16 lines are able to cover +/−8 pixels which is usually not large enough for most fixational eye motion from a 1-2 degree AOSLO. Typically, we combine two sampling strips to one strip for FFT-based cross correlation. This means that the algorithm starts strip-motion detection after it receive sampling strip #2 which combines with sampling strip #1, so that the FFT will work on a strip with 32-pixel height. When sampling strip #3 is received, it combines with sampling strip #2 for FFT operation, and so on. As a consequence, the first strip usually does not return any eye motion, thus the active stabilization mirror is frozen as well. This is not an issue in a closed-loop system, but may need careful adjustment of system parameters for open-loop control.

Other exemplary applications: The techniques can also be used to do fast offline image registration from a satellite camera, such as where multiple images can be registered according to the new system and method for real-time image registration correction described hereinabove and then averaged to achieve a high signal to noise ratio (SNR) image. For example, it is contemplated that the same real-time implementation for eye tracking could be used to optically stabilize satellite images having registration errors caused by, for example, camera shake due to mechanical motion from satellite parts and/or the motion of the satellite itself. For example, real-time and offline images from high-resolution solar telescopes can take advantage of this new image registration technology for real-time optical stabilization and digital registration.

Figure 8:
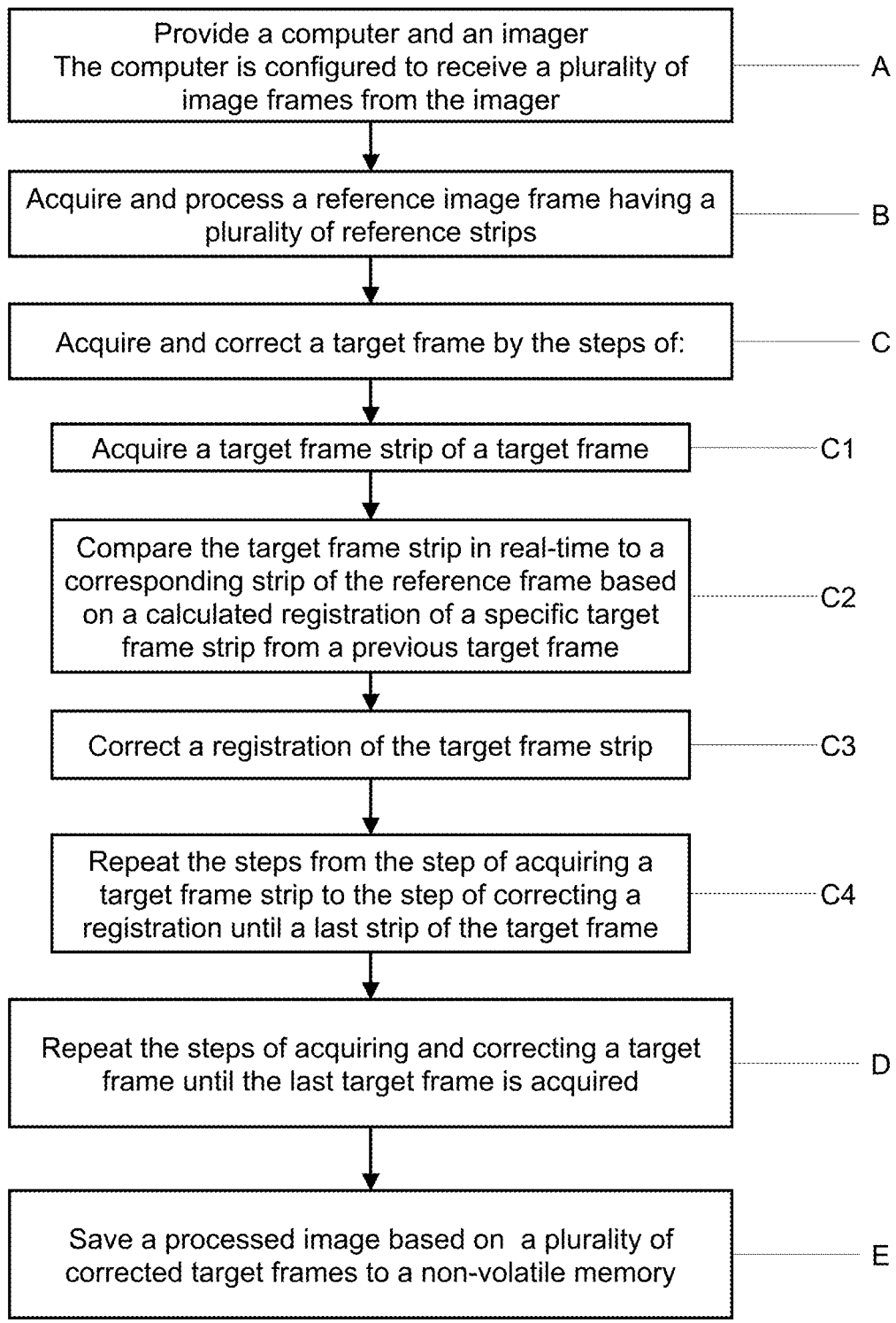
FIG. 8 shows a block diagram of an exemplary method for image registration according to the new method described herein.

Summary: FIG. 8 shows a block diagram for one exemplary method of image registration according to the new techniques described hereinabove. In general the method for image registration includes the steps of: A) provide a computer and an imager. The computer is configured to receive a plurality of image frames from the imager; B) acquire and process a reference image frame having a plurality of reference strips; C) acquire and correct a target frame by the steps of: C1) acquire a target frame strip of a target frame; C2) compare the target frame strip in real-time to a corresponding strip of the reference frame based on a calculated registration of a specific target frame strip (typically the specific strip is a center strip) from a previous target frame; C3) correct a registration of the target frame strip; and C4) repeat the steps from the step of acquiring and correcting a target frame strip to the step of correcting a registration until a last strip of the target frame; D) repeat the steps of acquiring a target frame until the last target frame is acquired; and E) save a processed image based on a plurality of corrected target frames to a non-volatile memory.

Theoretical Basis: The following sections describe Applicant's best present understanding of the theoretical basis of computational cost to better assist those skilled in the art to understand the inventive structures and methods described herein. Although the theoretical description given herein is thought to be correct, the operation of the devices described and claimed herein does not depend upon the accuracy or validity of the theoretical description. Later theoretical developments that may explain the observed results differently from the theory presented herein will not detract from the structures and methods described herein.

To analyze computational cost, we disassemble a complete cycle of traditional FFT-based cross correlation for motion (translation) detection into the following equation (3) to equation (7).

$$R(u,v) = FFT_{R2C}(r(x,y)) \quad (3)$$

$$T(u,v) = FFT_{R2C}(t(x,y)) \quad (4)$$

$$A(u,v) = R(u,v) \text{conj}(T(u,v)) \quad (5)$$

$$b(x,y) = FFT_{C2R}^{-}(A(u,v)) \quad (6)$$

$$(x,y)_{max} = \text{argmax}(b(x,y)) \quad (7)$$

where $r(x,y)$ is the reference image, $t(x,y)$ is the target image, FFTR2C( ) is the forward 2D real-to-complex FFT operator this is implemented with the CUDA function cufftExecR2C, FFT-1C2R( ) is the inverse 2D complex-to-real FFT operator (also implemented with cufftExecR2C), $A(u,v)$, $R(u,v)$, and $T(u,v)$ are images in frequency domain. $(x,y)$max is the translation between the reference image $r(x,y)$ and the target image $t(x,y)$. The most costly computations are the FFT operations (ie. Eq 3, 4 & 6). In a serial processor, Equation (5) involves 4N floating-point multiplication and 2N floating-point addition where N is the number of pixels in an image, however the computation is substantially accelerated on a multi-core GPU. Computation time for Equations (7) is small compared to the other four. Therefore, a typical cycle of one motion measurement involves three FFT operations from equations (3), (4) and (6) and one dot product from equation (7), with computation $$T(N) = 3O(N \log_2 N) + O(N) \quad (8)$$

Our solutions below reduce each cycle of FFT-based correlation from three to two PET's and at the same time reduce the size of image or the value of N with a total computation of $$T(n) = 2O(n \log_2 n) + O(n), \quad (9)$$

where n is significantly smaller than N in a traditional implementation. This optimization is valid for detecting all four categories of eye motions: drifts, microsaccades, saccades, and blinks and for re-locking a new eye position.

A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc. Computer code for computer processes intended to run on GPUs, CPUs, or any other computer processor for image registration as well as any related image and image registration data according to the inventive system and method described hereinabove are typically be stored on one or more computer readable non-transitory storage medium of any suitable types.

Any suitable computer running any suitable operating system can be used to perform the new process described hereinabove. Typically one or more processors, such as one or more processor cores configured for parallel processing are preferred. Such suitable processors can be found any suitable computer. Such suitable processors can also be found in computer graphics cards such as computer graphics cards available from NVidia™. Such suitable processors can also be programmed into any suitable programmable logic components, such as, for example, any suitable FPGA, such as those available from such companies as XILINX and ALTERA. It is understood that suitable programmable logic components could also be programmed as an application specific IC (ASIC) or as an application-specific standard product (ASSP). Suitable computers can include one or more personal computers, workstations, laptop, notebook, notepad, tablet, embedded computer, etc. Suitable operating systems include any suitable computer operating system (e.g. Windows™, LINUX, an Apple™ operating system, etc.) or any suitable real-time computer operating system (RTOS).

Any suitable imager or imaging device which can acquire successive image frames in time can be used as an imaging system to perform the new methods described herein. Exemplary suitable imagers include any suitable type of LASER imaging system or semiconductor imaging system having a plurality of detector cells, such as, for example, CMOS or CCD semiconductor imaging systems.

While the examples described herein generally relate to 2D imaging systems, it is contemplated that the new techniques can also be applied to correct partial images of three dimensional (3D) imaging systems. It is further contemplated that the new techniques described hereinabove can also be applied to one or more adaptive elements of a 3D imager.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for image registration comprising the steps of:
providing a computer and an imager, said computer configured to receive a plurality of image frames from said imager;
acquiring and processing a reference image frame comprising a plurality of reference strips;
acquiring and correcting a target frame by the steps of:
acquiring one or more target frame strips of said target frame;
comparing said one or more target frame strips in real-time to one or more corresponding strips of said reference frame based on a calculated registration of a specific target frame strip from a previous target frame;
correcting a registration of said one or more target frame strips;
repeating steps from said step of acquiring one or more target frame strips to said step of correcting a registration until a last strip of said target frame;
repeating said steps of acquiring and correcting a target frame until a last target frame is acquired; and
saving a processed image based on a plurality of corrected target frames to a non-volatile memory.

2. The method of claim 1, wherein said specific strip comprises a center strip.

3. The method of claim 1, wherein said plurality of corrected target frames are averaged together to create an averaged image with a signal to noise ratio (S/N) higher than the S/N of each individual target frame.

4. The method of claim 1, wherein a detected motion of one or more strips of said target frame exceeding a motion threshold causes said target frame to be not included in said plurality of corrected target frames.

5. The method of claim 4, wherein following said detected motion of one or more strips of said target frame which exceeds said motion threshold, a recovery process uses a two dimensional FFT of an entire target frame image to recover from a large motion.

6. The method of claim 4 wherein said detected motion comprises a saccade threshold or a blink threshold.

7. The method of claim 1, further comprising the step of removing a distortion or warping of said one or more target frame strips before said step of calculating the registration of each strip.

8. The method of claim 1, further comprising the step of removing noise from said one or more target frame strips by convolution before said step of calculating said registration of each strip.

9. The method of claim 1, further comprising the step of enhancing an image feature of said one or more target frame strips before said step of calculating said registration of each strip.

10. The method of claim 1, wherein said step of acquiring and processing a reference image frame comprises applying a two dimensional FFT to each strip of said reference frame and saving a two dimensional FFT result to a memory.

11. The method of claim 1, wherein said step of acquiring and processing a reference image frame comprises applying a two dimensional FFT to a number of combined strips of said reference frame and saving a two dimensional FFT result to a memory.

12. The method of claim 1, wherein said step of acquiring and processing a reference image frame comprises applying a two dimensional FFT to an entire frame of said reference frame and saving a two dimensional FFT result to a memory.

13. The method of claim 1, wherein said step of comparing said one or more target frame strips in real-time to one or more corresponding strips of said reference frame further comprises comparing a two dimensional FFT of said one or more target frame strips to a two dimensional FFT one or more reference strips by a cross-correlation operation.

14. The method of claim 1, wherein said step of comparing said one or more target frame strips in real-time to one or more corresponding strips of said reference frame further comprises comparing a two dimensional FFT of said one or more target frame strips to a two dimensional FFT one or more reference strips by a spatial domain cross correlation operation.

15. A real-time image processing system comprising:
an imager configured to acquire a plurality of image frames; and
a computer communicatively coupled to said imager, said computer configured by program code stored in a non-volatile memory to receive said plurality of image frames in real-time as strips of said image frames and to process said strips in real-time so as to correct a registration of said one or more strips by comparing one or more target frame strips in real-time to one or more corresponding strips of a reference frame based on a calculated registration of a specific target frame strip from a previous target frame, and to combine a plurality of registration corrected target frames to provide a processed image saved to a non-volatile memory, said processed image having a S/N ratio higher than the S/N of each individual target frame.

16. The real-time image processing system of claim 15, wherein said imager comprises a LASER scanning imager.

17. The real-time image processing system of claim 15, wherein said imager comprises an imaging device comprising a plurality of detector cells.

18. The real-time image processing system of claim 15, wherein said imager comprises semiconductor imaging device.

19. The real-time image processing system of claim 15, wherein said system further comprises at least one adaptive element having a controllable position, wherein said controllable position is updated during acquisition of one or more target frames based on a real-time target frame strip registration process.

20. The real-time image processing system of claim 19, wherein said adaptive element comprises a controllable mirror.

21. The real-time image processing system of claim 19, wherein said imager comprises an adaptive optics scanning light ophthalmoscope (AOSLO).

22. The real-time image processing system of claim 19, wherein said imager comprises a satellite imager.

23. The real-time image processing system of claim 15, wherein said image processing system comprises a 3D imager.

* * * * *